(12) United States Patent
Augenstein et al.

(10) Patent No.: US 9,009,430 B2
(45) Date of Patent: Apr. 14, 2015

(54) RESTORATION OF DATA FROM A BACKUP STORAGE VOLUME

(75) Inventors: Oliver Augenstein, Wilen bei Wollerau (CH); Stefan Letz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 13/305,774

(22) Filed: Nov. 29, 2011

(65) Prior Publication Data

US 2012/0144136 A1 Jun. 7, 2012

(30) Foreign Application Priority Data

Dec. 2, 2010 (EP) .................................. 10193448

(51) Int. Cl.
*G06F 12/16* (2006.01)
*G06F 11/14* (2006.01)
*G06F 11/20* (2006.01)

(52) U.S. Cl.
CPC ........ *G06F 11/1469* (2013.01); *G06F 11/2074* (2013.01); *G06F 11/1456* (2013.01); *G06F 11/1471* (2013.01)

(58) Field of Classification Search
CPC ............ G06F 11/2074; G06F 11/1456; G06F 11/1471; G06F 11/14699
USPC ............................ 711/162, E12.001, E12.103
See application file for complete search history.

(56) References Cited

U.S. PATENT DOCUMENTS

| | | | |
|---|---|---|---|
| 6,732,124 B1 * | 5/2004 | Koseki et al. ................. | 711/162 |
| 6,748,504 B2 | 6/2004 | Sawdon et al. | |
| 7,051,050 B2 | 5/2006 | Chen et al. | |
| 7,103,796 B1 | 9/2006 | Kekre et al. | |
| 7,152,078 B2 * | 12/2006 | Yamagami ..................... | 711/162 |
| 7,523,278 B2 | 4/2009 | Thompson et al. | |
| 7,716,183 B2 | 5/2010 | Lee | |
| 7,752,170 B2 | 7/2010 | Boutcher | |
| 7,761,741 B2 | 7/2010 | Amano et al. | |
| 2002/0069363 A1 * | 6/2002 | Winburn ........................ | 711/162 |
| 2006/0064444 A1 | 3/2006 | van Ingen et al. | |
| 2006/0253731 A1 * | 11/2006 | Petruzzo ........................... | 714/6 |
| 2008/0282047 A1 | 11/2008 | Arakawa et al. | |

OTHER PUBLICATIONS

Na Wen-wu et al., "VSD: A Framework of Stackable Virtual Snapshop Device", 2009 IEEE International Conference on Networking, Architecture, and Storage.

* cited by examiner

*Primary Examiner* — Pierre-Michel Bataille
(74) *Attorney, Agent, or Firm* — Thomas E. Lees, LLC

(57) ABSTRACT

A method is provided for restoring data from a backup storage volume onto a source storage volume. A content of a memory unit of the backup storage volume and a content of the corresponding memory unit of the source storage volume are loaded into a computer memory, and are compared in the computer memory for identity. The content of the memory unit of the backup storage volume is written to the corresponding memory unit of the source storage volume if the comparison indicates that the content of the compared memory units is not identical. The invention further relates to a system for restoring data from a backup storage volume onto a source storage volume comprising a restore software running on a data processing device, which is connected to the backup storage volume and the source storage volume, whereby the restore software performs the above method.

18 Claims, 6 Drawing Sheets

RESTORATION OF DATA FROM A BACKUP STORAGE VOLUME

CROSS-REFERENCE TO RELATED APPLICATIONS

This application claims priority to European Patent Application No. 10193448.7, filed Dec. 2, 2010, the disclosure of which is incorporated herein by reference.

FIELD OF INVENTION

Various aspects of the present invention relate generally to a method, computer-readable medium, computer program product and system for restoring data from a backup storage volume onto a source storage volume.

BACKGROUND

Backups of storage volumes are an important issue in computer technology. For example, backups of storage volumes are used to create backups of data volumes to avoid a loss of data. Backups of storage volumes are also used to create backups of system volumes, which contain an installation of an operating system and additional applications. Backups of system volumes are used for installation purposes (e.g., in the case of the installation of identical or similar hardware devices with the same software) or restoration purposes, (e.g., in the case of failures of the installed system after creating the backup). Since the storage volumes usually contain a huge amount of data, efficient methods for backup and restoration of data are required.

BRIEF SUMMARY

According to aspects of the present invention, data is restored from a backup storage volume onto a source storage volume. Data is restored by loading into a computer memory, content of a memory unit associated with an address of the backup storage volume and loading into the computer memory, content of a memory unit associated with an address of the source storage volume, where the address of the source storage volume corresponds to the address of the backup storage volume. Data is further restored by comparing, using a processor, the content of the memory unit of the backup storage volume and the content of the corresponding memory unit of the source storage volume loaded in the computer memory, and writing the content of the memory unit of the backup storage volume to the corresponding memory unit of the source storage volume if the comparison indicates that the content of the compared memory units is not identical.

BRIEF DESCRIPTION OF THE SEVERAL VIEWS OF THE DRAWINGS

Embodiments of the invention are illustrated in the accompanied figures. These embodiments are merely exemplary, i.e., they are not intended to limit the content and scope of the appended claims.

DETAILED DESCRIPTION

According to aspects of the present invention, a method for restoring data from a backup storage volume onto a source storage volume is provided, whereby a content of a memory unit of the backup storage volume and a content of the corresponding memory unit of the source storage volume are loaded into a computer memory. The content of the memory unit of the backup storage volume and the content of the corresponding memory unit of the source storage volume are compared in the computer memory for identity, and the content of the memory unit of the backup storage volume is written to the corresponding memory unit of the source storage volume if the comparison indicates that the content of the compared memory units is not identical.

Accordingly, aspects of the present invention compare the content of memory units of the source storage volume and the backup storage volume to avoid writing the source storage volume when the content of the memory units is identical. The comparison guarantees that the source storage volume contains the desired data after the restoration process is finished. Moreover, by not writing memory units to the source storage volume if the content of the memory units is identical, an increased performance for restoring the data is achieved, because usually only a minor part of the source storage volume is modified after creating the backup storage volume.

A corresponding system for restoring data from a backup storage volume onto the source storage volume comprises a restore software, which is running on a data processing device, which is connected to the backup storage volume and the source storage volume, whereby the restore software performs the above method. For example, the data processing device can be any kind of personal computer (PC) and the backup storage volume and the source storage volume can be logical or physical drives within the PC. Also, the backup storage volume and the source storage volume can be located on the same physical storage device. This allows creating and restoring backups in a time-efficient manner, since local storage volumes can be rapidly accessed. The storage volumes can be logical volumes on a single hard disk device. Nevertheless, it is also possible that the backup storage volume is provided on any kind of external storage device, e.g., via a network connection or locally on a backup tape. The connection can be made by any kind of data wiring inside the PC, or via any interface and/or network connection. Also, other kinds of physical storage devices, which are known in the art but not explicitly mentioned, can be used instead of the storage device described here by a way of example.

Figure 1:
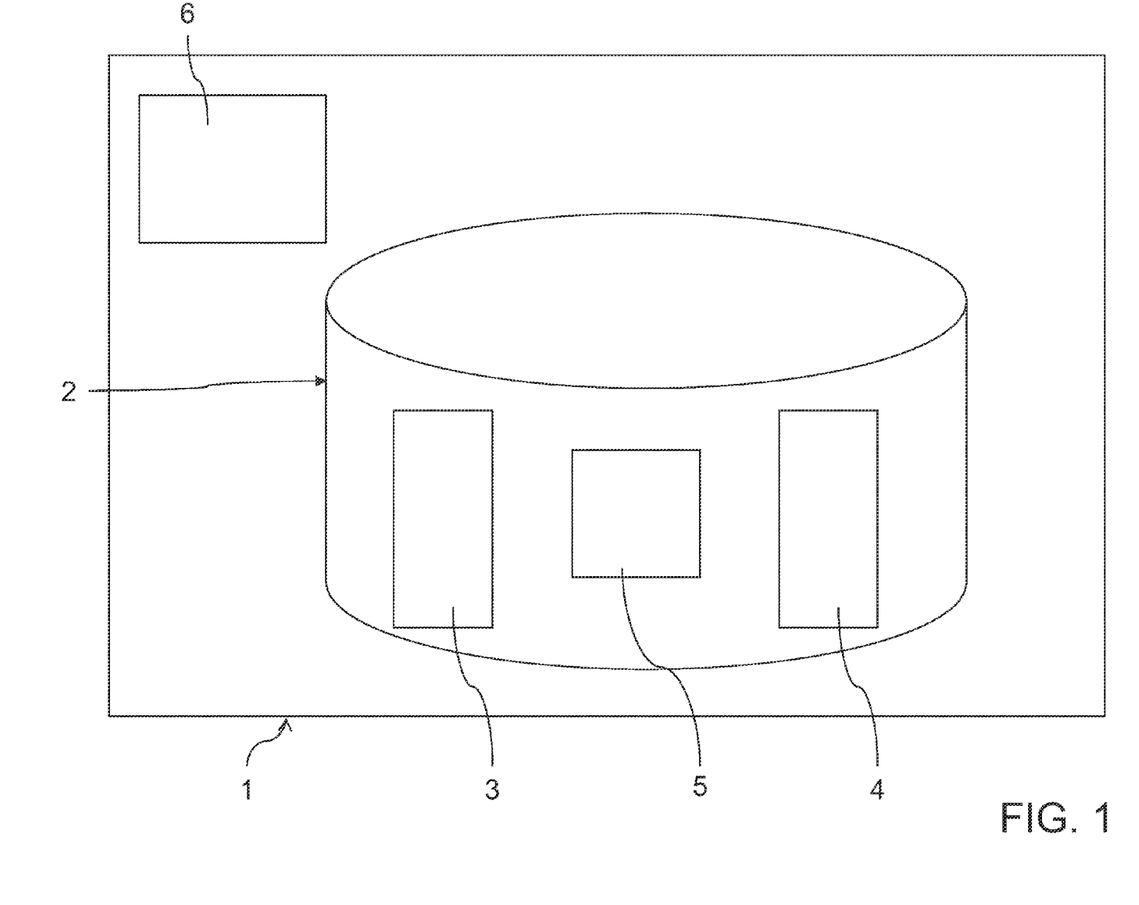
FIG. 1 shows a schematic diagram of a system for restoring data from a backup storage volume onto a source storage volume.

Referring now to FIG. 1, a system 1 for restoring data is schematically shown. The system 1 comprises physical hardware with a data processing device and a storage device 2, which is in this case a hard disk drive. The physical hardware that is not schematically shown in the figures can be e.g., a standard personal computer (PC). In this embodiment of the present invention, the physical storage device 2 is also contained in the physical hardware. The physical storage device 2 contains a source storage volume 3 and a backup storage volume 4 as logical volumes. Furthermore, a change log 5, e.g., implemented as a database, is stored on the physical storage device 2, which contains a change log as explained in detail later. The system 1 further comprises restore software 6, which is executed on the data processing device. Accordingly, the restore software 6 has direct access to the source storage volume 3 and backup storage volume 4.

Figure 2:
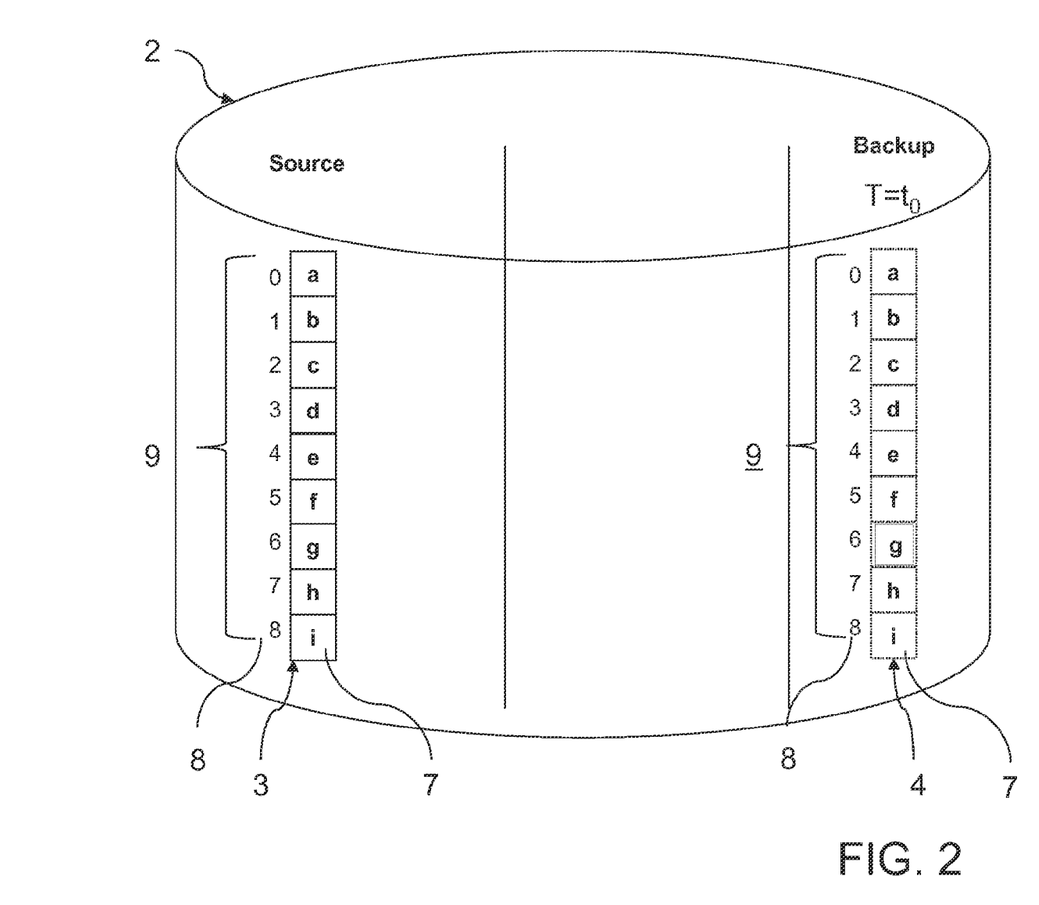
FIG. 2 shows a schematic diagram of the source storage volume and the backup storage volume of FIG. 1 in detail.

Now referring to FIG. 2, the physical storage device 2 with the source storage volume 3 and the backup storage volume 4 is shown in more detail. The source storage volume 3 and the backup storage volume 4 each comprise a number of memory units 7, which are organized by an address 8, which allows access to each of the memory units 7. The addresses 8 of each of the source storage volume 3 and the backup storage volume 4 together form a mapping table 9, which allows identification of all memory units 7. At a time T=t0, the backup storage volume 4 is created as a snapshot of the source storage volume 3. Accordingly, only the mapping table 9 of the source storage volume 3 is copied. Nevertheless, for demonstration purposes, FIG. 2 also shows all memory units 7 of the backup storage volume 4, even though the memory units 7 are not physically copied from the source storage volume 3. To indicate that the memory units 7 are not physically copied from the source storage volume 3, the memory units 7 of the backup storage volume 4 are shown with dashed outline. In an alternative embodiment of the present invention, all memory units 7 of the source storage volume 3 can be physically copied to the backup storage volume 4 at the time T=t0.

Figure 3:
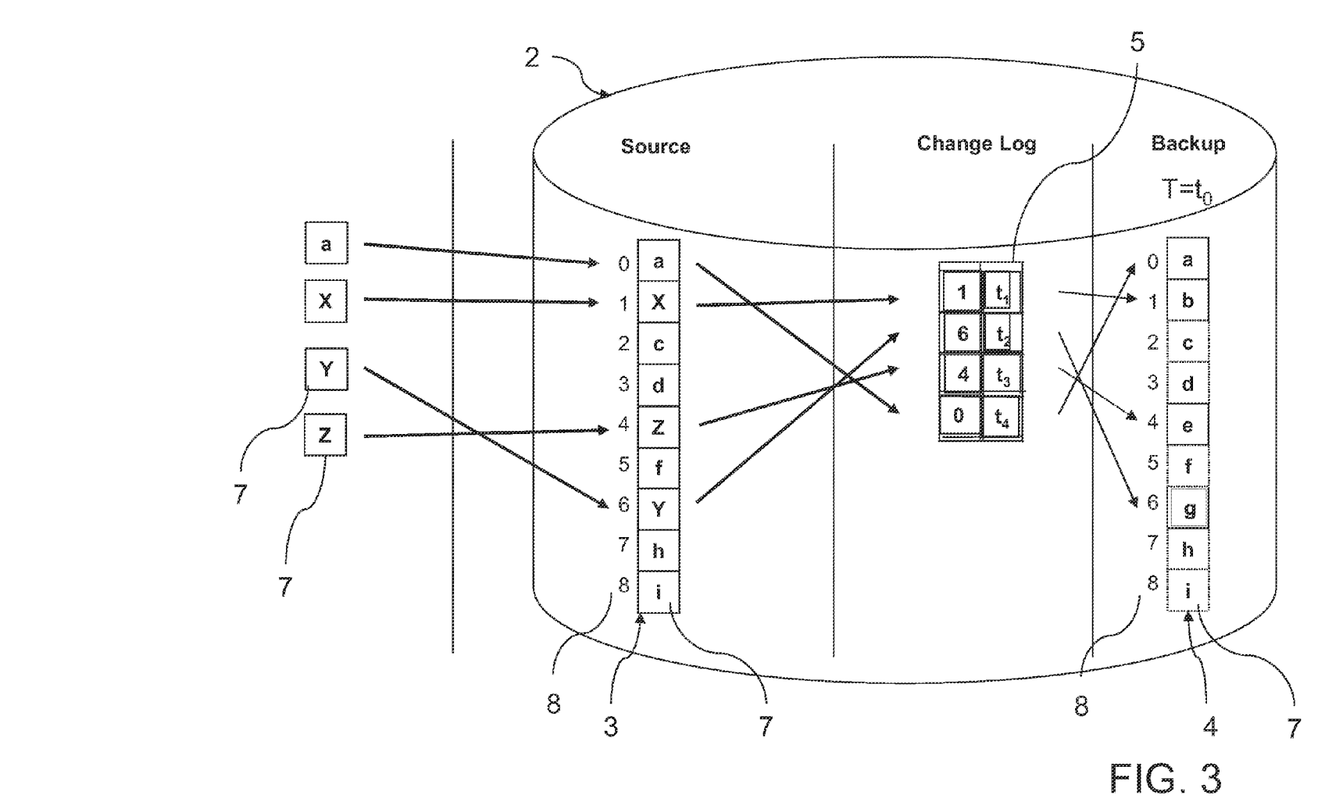
FIG. 3 shows modifications of the source storage volume in the diagram according to FIG. 2 and the creation of a change log.

As illustrated in FIG. 3, in this example, after creation of the backup storage volume 4, the source storage volume 3 is further used, e.g., by applications running on the data processing device. Accordingly, at subsequent times t1 to t4, different memory units 7 of the source storage volume 3 are re-written with memory units 7 (having values a, X, Y and Z respectively, illustrated to the left of the vertical line, which is adjacent to the physical storage device 2). Accordingly, an entry for the change log 5 is generated for each memory unit 7 that is re-written. The change log 5 contains the address 8 of the re-written memory unit 7 and the timestamp indicating when the memory unit 7 has been re-written. The change log 5 is created by the restore software 6, which monitors the access to the source storage volume 3 and is triggered by a write operation on the source storage volume 3.

Furthermore, the content of memory units 7 to be re-written is copied from the source storage volume 3 to the backup storage volume 4, before the content is altered. This implements a copy-on-write functionality, so that no content of the source storage volume 3 is lost. Accordingly, in FIG. 3, the outline of the memory units 7 that are copied to the backup storage volume 4 is changed to a continuous outline, since physical memory is allocated and contains the respective memory units 7. Depending on the number of re-written memory units 7 of the source storage volume 3, the size of the backup storage volume 4 increases. In the example shown in FIG. 3, the physical size of the backup storage volume 4 is formed by four memory units 7 and is therefore less than half of the size of the source storage volume 3.

The memory units 7 in this embodiment of the present invention are logical memory units, i.e., logical blocks of the source storage volume 3 and the backup storage volume 4, and are accessible by means of an operating system or other software executed on the data processing device. Accordingly, no further functionality has to be implemented for accessing the source storage volume 3 and the backup storage volume 4.

Figure 6:
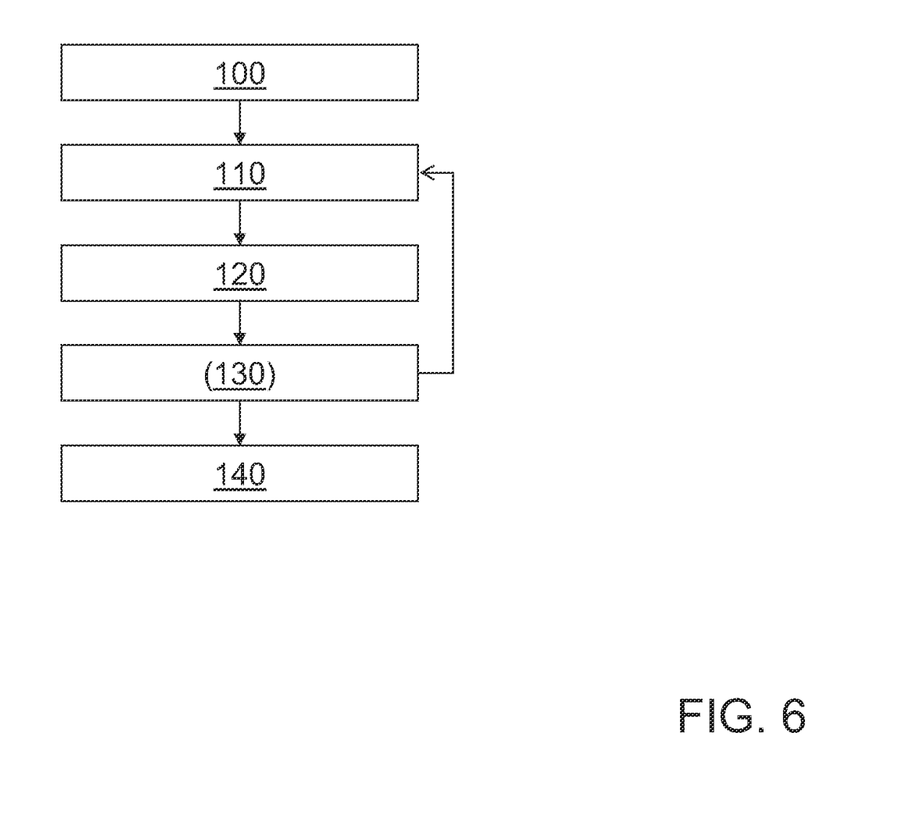
FIG. 6 shows a flowchart representing a method for restoring data from a backup storage volume onto a source storage volume.

A method for restoring data from the backup storage volume 4 onto the source storage volume 3 is shown as a flowchart in FIG. 6. According to step 100, the restore software 6 requests a timestamp for restoration of the source storage volume 3. In this example, restoration is performed for the timestamp T=t0, so that all modifications of the source storage volume 3 after creation of the backup storage volume 4 are considered. Nevertheless, it is also possible to restore the source storage volume 3 according to a different timestamp, e.g., T=t2, since the timestamp of each change of memory units 7 is stored in the change log 5. In this case, only modifications of the source storage volume 3 that occurred at T=t2 or later are considered for restoring data from the backup storage volume 4. The restore software 6 is in control of the entire restore method.

In step 110, the content of the first memory unit 7 indicated by the change log 5 is loaded pairwise from the source storage volume 3 and the backup storage volume 4. This is also demonstrated in FIG. 4.

In step 120, the restore software 6 performs a pairwise comparison of the content of the corresponding memory units 7 of the source storage volume 3 and the backup storage volume 4.

If the comparison of the content of the memory units 7 in step 120 determines that the two memory units 7 have identical content, no further processing is performed for the respective memory units 7. Otherwise, in optional step 130, the restore software 6 writes the content of the memory unit 7 of the backup storage volume 4 from the memory of the physical hardware directly onto the memory unit 7 of the source storage volume 3, without reading it again from the backup storage volume 4.

Figure 4:
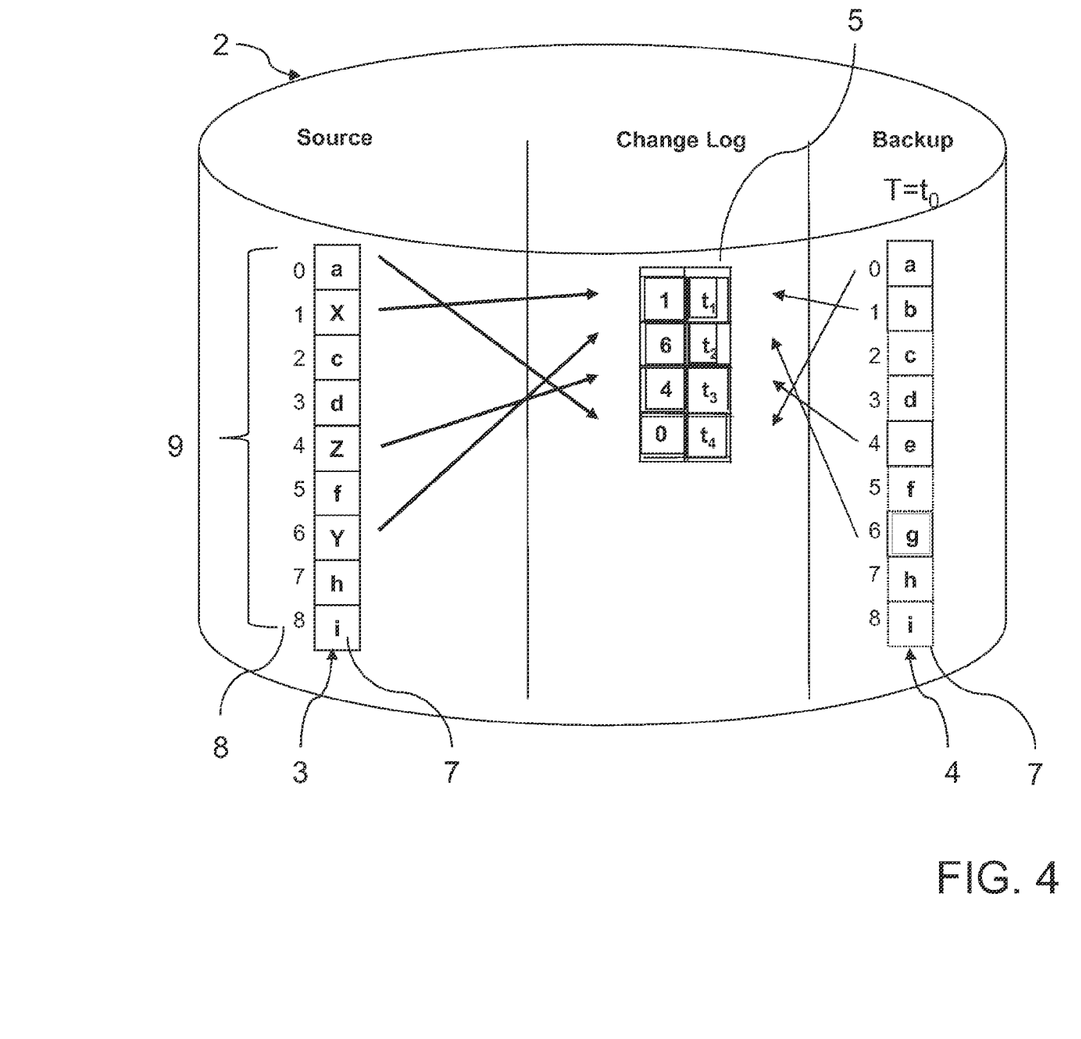
FIG. 4 shows a schematic diagram indicating a comparison of the content of memory units of the source storage volume and the backup storage volume of FIG. 3.
Figure 5:
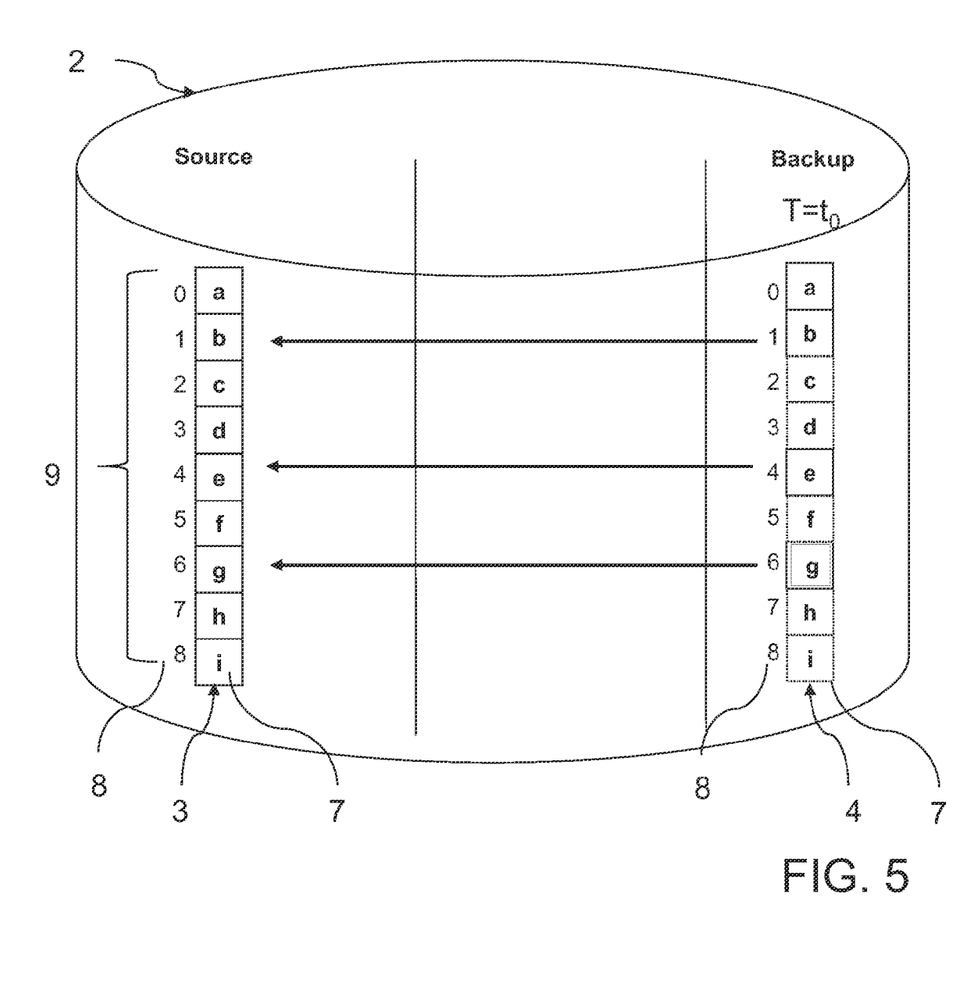
FIG. 5 is a schematic diagram indicating the restoration of the source storage volume of FIG. 4 with memory units from the backup storage volume.

The steps 110 to 130 are repeated for all entries of the change log 5. The results of the processing of steps 110 to 130 for the example of FIGS. 2-4 are schematically illustrated in FIG. 5. When all entries of the change log 5 have been processed, the method finishes in step 140.

In an alternative embodiment of the present invention, no change log 5 is present. Accordingly, step 100 is omitted and the process starts directly with step 110.

In step 110, the memory units 7 of the source storage volume 3 and the backup storage volume 4 are processed starting with the memory unit 7 indicated by the first address 8. The content of the respective memory units 7 is read into the memory of the physical hardware by the restore software 6.

In step 120, the content is compared to determine whether it is identical or not. Without the change log 5, more memory units 7 have to be compared and identity of the content of memory units will more frequently occur. If the content is not identical, in the optional step 130 the restore software 6 writes the content of the memory unit 7 of the backup storage volume 4 from the memory of the physical hardware directly onto the memory unit 7 of the source storage volume 3.

The steps 110 to 130 are repeated for the entire content of the source storage volume 3 and the backup storage volume 4. For example, based on the content as shown in FIG. 3, only three memory units 7 are identified as not having identical content on the source storage volume 3 and the backup storage volume 4 (see blocks 1, 4 and 6 of address 8). Therefore, only the content of these memory units 7 is restored from the backup storage volume 4 onto the respective memory units 7 of the source storage volume 3.

According to various aspects of the present invention, a system is provided to perform the methods described more fully herein with reference to FIGS. 1-6. According to further aspects of the present invention, a computer program product comprising a computer-usable medium including a computer-usable program code is provided, where the computer-usable program code is adapted to execute the to the methods described more fully herein with reference to FIGS. 1-6. According to still further aspects of the invention, a computer-readable medium containing a set of instructions is provided. The set of instructions, when executed, cause a computer to perform the methods described more fully herein with reference to FIGS. 1-6.

According to further aspects of the present invention, copy commands of an operating system are used to access the backup storage volume and the source storage volume to restore data. These copy commands are simple and easy to use, and therefore provide a powerful but simple means for creating and restoring a backup from a backup storage volume. However, a user of these operating system commands is not aware of the underlying behavior, e.g., whether the copy command automatically triggers a copy-on-write operation, which for example can happen when a snapshot of the source storage volume exists. The restoration methods described more fully herein, do not trigger monitoring technologies, which monitor the use of a write command of the operating system, for data that does not need to be re-written to the source storage volume.

According to further aspects of the present invention, a change log indicates each write operation on a memory unit of the source storage volume after creation of the backup storage volume, and the content of a memory unit of the backup storage volume is considered for restoration if the change log indicates a write operation on the corresponding memory unit of the source storage volume. In the respective system, a database is provided as a change log for storing write operations on memory units of the source storage volume after creation of the backup storage volume. The database can be implemented as a list containing the changes. This change log allows an easy identification of memory units that have to be re-written on the source storage volume, so that restoring memory units from the backup storage volume can be limited to those memory units of the source storage volume that are identified in the change log.

Therefore, using the change log helps to further reduce the time for restoring data from the backup storage volume. Nevertheless, being listed in the change log does not indicate a modification of the content of the memory unit on the source storage device but merely indicates whether a write operation has been executed on this memory unit. In case identical content is written to the memory unit, it will be added to the change log nevertheless. The change log itself benefits from the restoration method of the present invention in that it does not grow when a backup storage volume is restored onto the source storage volume.

Moreover, various aspects of the invention provide an increased efficiency. By way of example, typically, about 10% of a source storage volume is modified compared to the corresponding backup storage volume. Furthermore, the number of write operations on the source storage volume is reduced. Since write operations are usually more time-consuming than read operations, the restoration of the data can be completed in less time. Furthermore, in cases where the backup storage volume is a snapshot of the source storage volume, memory units read from the backup storage volume and the source storage volume tend to be physically identical, which results in even less physical read operations.

According to further aspects of the present invention, components that monitor write operations on the source storage volume will only be triggered if the content of the source storage volume has been modified, and not by merely writing identical data to memory units of the source storage volume during restore.

Still further, aspects of the present invention can be used together with different kinds of backup, and are compatible with the use of components that monitor modifications of the source storage volume.

According to still further aspects of the present invention, a memory unit is a physical memory unit of a storage volume and reading the content of a memory unit from a storage volume as well as writing the content of a memory unit to the source storage volume comprises directly accessing the physical memory unit. For example, the memory units represent memory blocks of a physical hard disk drive and can therefore be subsequently read from the physical storage device. This allows to access the memory units of the source storage volume as well as of the backup storage volume in the manner that is most efficient depending on the used physical storage device, e.g., when using a hard disk drive, memory blocks are read most efficiently subsequently, so that a read/write head of the hard disk drive does not have to be repositioned when switching from one to another memory unit.

In an illustrative implementation, a memory unit is a logical memory unit of a storage volume and reading the content of a memory unit from a storage volume as well as writing the content of a memory unit to the source storage volume comprises accessing the logical memory unit. Logical memory units can be formed by files, which are groups of physical memory units, or by logical units of physical memory units, which are organized on a level below the file system but on top of physical memory units. Access to logical units is usually arranged by high-level functions of an operating system and can therefore be easily used without prior knowledge about the underlying hardware.

In a further illustrative implementation, writing the content of the memory unit of the backup storage volume to the corresponding memory unit of the source storage volume comprises writing the content from the computer memory. In case the comparison of the content of the memory unit of the backup storage volume and the corresponding memory unit of the source storage volume indicates that the two memory units do not have identical content, the content of the memory unit to be restored from the backup storage volume can directly be written from the computer memory without an additional reading step, since the content is already available in the computer memory from the comparison.

In an illustrative implementation, according to various aspects of the present invention, the backup storage volume is a snapshot of the source storage volume. Snapshots are created by first copying a mapping table of the source storage volume, so that the backup can be created without copying the content of any memory unit and is therefore time-efficient. After the mapping table has been copied, a modification of the content of a memory unit of the source storage volume is identified by the system and the original memory unit of the source storage volume is copied to the backup storage volume before being re-written.

The mapping table of the backup storage volume is then altered to indicate the memory unit as stored on the backup storage volume. Especially in the case of restoring a backup storage volume that is a snapshot of the source storage volume, aspects herein avoid a requirement that all memory units of the source storage volume are re-written and accordingly indicated in the snapshot. Re-writing all memory units of the source storage device results in an immediate and unnecessary increase of the size of the backup storage volume to the size of the source storage. Furthermore, in cases of "thin provisioning", whereby it is assumed that a snapshot will usually contain only a certain amount of modified memory units and thus the memory space available for the snapshot is limited, e.g., to 20% of the memory size of the source storage volume, restoration of backups by re-writing all memory units leads to a physical "out-of-space" condition, which will invalidate the snapshot.

Various aspects of the present invention are achieved by computer-readable mediums such as a storage device, a floppy disk, compact disc (CD), digital versatile disc (DVD), Blu-ray disc, or random access memory (RAM), containing a set of instructions that causes a computer to perform a method as specified above. The object is further achieved by a computer program product comprising a computer-usable medium including a computer-usable program code, wherein the computer-usable program code is adopted to execute the method as described above.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.), or an embodiment combining software and hardware aspects that may all generally be referred to herein as a "circuit," "module", or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, e.g., in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, radio frequency (RF), etc., or any suitable combination of the foregoing.

Computer program code for carrying out operations for aspects of the present invention may be written in any combination of one or more programming languages, including object-oriented programming languages such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

The invention claimed is:

1. A system for restoring data from a backup storage volume onto a source storage volume, the system comprising:

a processor coupled to the backup storage volume, the source storage volume, and a computer memory having restore software therein;
wherein the processor is programmed execute the restore software to restore data by:
taking a snapshot of the source storage volume to create the storage backup storage volume;
creating a change log indicating addresses of the source storage volume that have been written to after the taking of the snapshot;
identifying a select address from the change log;
loading into a computer memory, content of a memory unit of the backup storage volume corresponding to the select address;
loading into the computer memory, content of a memory unit of the source storage volume corresponding to the select address;
comparing, using a processor, the content of the memory unit of the backup storage volume and the content of the corresponding memory unit of the source storage volume loaded in the computer memory; and
writing the content of the memory unit of the backup storage volume to the corresponding memory unit of the source storage volume if the comparison indicates that the content of the compared memory units are not identical.

2. The system according to claim 1, wherein:
writing the content of the memory unit of the backup storage volume to the corresponding memory unit of the source storage volume comprises the processor further programmed to execute the restore software by using the copy commands of an operating system accessing the backup storage volume and the source storage volume.

3. The system according to claim 1, wherein writing to the change log further comprises the processor further programmed to execute the restore software by writing the address of the source storage volume that has been written to and a corresponding timestamp.

4. The system according to claim 1, wherein:
a memory unit is a physical memory unit of a storage volume;
further comprising the processor further programmed to execute the restore software by:
directly accessing the physical memory unit for reading the content of a memory unit from a storage volume and for writing the content of a memory unit to the source storage volume.

5. The system according to claim 1, wherein:
a memory unit is a logical memory unit of a storage volume;
further comprising the processor further programmed to execute the restore software by:
accessing the logical memory unit for reading the content of a memory unit from a storage volume and writing the content of a memory unit to the source storage volume.

6. The system according to claim 1, wherein:
writing the content of the memory unit of the backup storage volume to the corresponding memory unit of the source storage volume comprises the processor further programmed to execute the restore software by writing the content from the computer memory.

7. A method for restoring data from a backup storage volume onto a source storage volume, the method comprising:
taking a snapshot of the source storage volume to create the storage backup storage volume;
creating a change log indicating addresses of the source storage volume that have been written to after the taking of the snapshot;
identifying a select address from the change log;
loading into a computer memory, content of a memory unit of the backup storage volume corresponding to the select address;
loading into the computer memory, content of a memory unit of the source storage volume corresponding to the select address;
comparing, using a processor, the content of the memory unit of the backup storage volume and the content of the corresponding memory unit of the source storage volume loaded in the computer memory; and
writing the content of the memory unit of the backup storage volume to the corresponding memory unit of the source storage volume if the comparison indicates that the content of the compared memory units are not identical.

8. The method according to claim 7, wherein:
writing the content of the memory unit of the backup storage volume to the corresponding memory unit of the source storage volume comprises using copy commands of an operating system accessing the backup storage volume and the source storage volume.

9. The method according to claim 7, wherein writing to the change log further includes writing the address of the source storage volume that has been written to and a corresponding timestamp.

10. The method according to claim 7, wherein:
a memory unit is a physical memory unit of a storage volume;
further comprising:
directly accessing the physical memory unit for reading the content of a memory unit from a storage volume and for writing the content of a memory unit to the source storage volume.

11. The method according to claim 7, wherein:
a memory unit is a logical memory unit of a storage volume;
further comprising:
accessing the logical memory unit for reading the content of a memory unit from a storage volume and writing the content of a memory unit to the source storage volume.

12. The method according to claim 7, wherein:
writing the content of the memory unit of the backup storage volume to the corresponding memory unit of the source storage volume comprises writing the content from the computer memory.

13. A computer readable storage device with an executable program for restoring data from a backup storage volume onto a source storage volume stored thereon, wherein the program instructs a processor to perform:
taking a snapshot of the source storage volume to create the storage backup storage volume;
creating a change log indicating addresses of the source storage volume that have been written to after the taking of the snapshot;
identifying a select address from the change log;
loading into a computer memory, content of a memory unit of the backup storage volume corresponding to the select address;
loading into the computer memory, content of a memory unit of the source storage volume corresponding to the select address;

comparing, using a processor, the content of the memory unit of the backup storage volume and the content of the corresponding memory unit of the source storage volume loaded in the computer memory; and writing the content of the memory unit of the backup storage volume to the corresponding memory unit of the source storage volume if the comparison indicates that the content of the compared memory units are not identical.

14. The computer readable storage device according to claim 13, wherein:

the executable program that instructs the processor to perform writing the content of the memory unit of the backup storage volume to the corresponding memory unit of the source storage volume comprises executable program code that instructs the processor to perform using the copy commands of an operating system accessing the backup storage volume and the source storage volume.

15. The computer readable storage device according to claim 13, wherein the executable program code that instructs the processor to perform writing to the change log further includes executable program code that instructs the processor to perform writing the address of the source storage volume that has been written to and a corresponding timestamp.

16. The computer readable storage device according to claim 13, wherein:

a memory unit is a physical memory unit of a storage volume;

further comprising executable program code that instructs the processor to perform:

directly accessing the physical memory unit for reading the content of a memory unit from a storage volume and for writing the content of a memory unit to the source storage volume.

17. The computer readable storage device according to claim 13, wherein:

a memory unit is a logical memory unit of a storage volume;

further comprising executable program code that instructs the processor to perform:

accessing the logical memory unit for reading the content of a memory unit from a storage volume and writing the content of a memory unit to the source storage volume.

18. The computer readable storage device according to claim 13, wherein:

the executable program code that instructs the processor to perform writing the content of the memory unit of the backup storage volume to the corresponding memory unit of the source storage volume comprises the executable program code that instructs the processor to perform writing the content from the computer memory.

* * * * *